United States Patent [19]

Prasad et al.

[11] Patent Number: 5,487,017
[45] Date of Patent: Jan. 23, 1996

[54] CIRCUIT ACTIVITY DRIVEN MULTILEVEL LOGIC OPTIMIZATION FOR LOW POWER RELIABLE OPERATION

[75] Inventors: Sharat Prasad, Dallas; Kaushik Roy, Richardson, both of Tex.

[73] Assignee: Texas Instruments Incorporated, Dallas, Tex.

[21] Appl. No.: 18,984

[22] Filed: Feb. 18, 1993

[51] Int. Cl.$^6$ .................................................. H03M 5/00
[52] U.S. Cl. ...................... 364/488; 364/489; 364/490
[58] Field of Search .................................. 364/488, 489, 364/490, 491

[56] References Cited

U.S. PATENT DOCUMENTS 4,792,909  12/1988  Serlet ....................................... 364/491

OTHER PUBLICATIONS

A Fast Computer Algorithm For The Generation of . . . Specified Booleam Functions, IEEE 1991.
The Testability–Preserving Concurrent . . . Boolean Expressions, IEEE 1992.
A Method For Concurrent Decomposition . . . Boolean Expressions.
Multilevel Logic Synthesis of Symmetric Switching Functions.
Robert K. Brayton, "MIS: A Multiple–Level Logic Optimization System", extracted from: IEEE Transaction on Computer–Aided Design, vol. CAD-6, No. 6, Nov. 1987.

*Primary Examiner*—Kevin J. Teska
*Assistant Examiner*—Dan Fiul
*Attorney, Agent, or Firm*—Jacqueline J. Garner; Richard L. Donaldson; William E. Hiller

[57] ABSTRACT

A method and apparatus for optimizing a boolean network. The boolean network contains a plurality of functions and a plurality of nodes. Any cube-free divisors (a divisor in which no cube divides the divisor evenly) in the boolean network which apply to at least two of the functions are located (108). The greatest divisor, which is defined as the cube-free divisor which brings about the largest net savings, is determined (114). The net savings comprises both an area savings component and a power savings component. Once the greatest divisor is determined, it is replaced with a variable in each of the functions (116) and added to the boolean network as a new function to create an optimized boolean network (118).

14 Claims, 5 Drawing Sheets

5,487,017

CIRCUIT ACTIVITY DRIVEN MULTILEVEL LOGIC OPTIMIZATION FOR LOW POWER RELIABLE OPERATION

FIELD OF THE INVENTION

This invention generally relates to multilevel logic optimization and more specifically to circuit activity driven multilevel logic optimization for low power reliable operation.

BACKGROUND OF THE INVENTION

As semiconductor technology progresses, more and more complex logic functions are desired on a single integrated circuit. In recent years, various techniques for implementing complex combinational logic in multiple level formats have been developed. Multiple level logic contains intermediate signals in addition to inputs and outputs. Multilevel optimization of this logic involves creating new intermediate signals and/or removing some of the existing intermediate signals. The traditional optimization criterion for multilevel logic synthesis is to minimize the area occupied by the logic equations (which is measured as a function of the number of gates, transistors, and nets in the final set of equations) while simultaneously satisfying the timing constraints derived from a system level analysis of the chip.

One technique for multilevel optimization is the Multilevel Logic Interactive Synthesis System (MIS). (See, R. Brayton et. al., "MIS: A Multiple-Level Logic Optimization System", IEEE Trans. on Computer-Aided Design, November, 1987, pp. 1062–1081.) The input to the optimization process is a set of boolean functions. A procedure, called Kernel, finds some or all cube-free multiple or single cube divisors of each of the functions and retains those divisors which are common to two or more functions. The best few common divisors are factored out and the affected functions are simplified by a second procedure called substitution. Kernel, selection of the best few divisors, and substitution are repeated until no common divisors can be found. The "goodness" of a divisor is measured by the magnitude of area saving it brings about.

Although multilevel logic optimizers such as MIS are a vast improvement over prior methods, the basic optimization criterion is limited to minimizing area while still satisfying time constraints.

SUMMARY OF THE INVENTION

Generally, and in one form of the invention, a method and apparatus for optimizing a boolean network is disclosed. The boolean network contains a plurality of functions and a plurality of nodes. Any cube-free divisors in the boolean network which apply to at least two of the functions are located. The greatest divisor, which is defined as the cube-free divisor which brings about the largest net savings, is determined. The net savings comprises both an area savings component and a power savings component. Once the greatest divisor is determined, it is replaced with a variable in each of the functions and added to the boolean network as a new function to create an optimized boolean network.

An advantage of the invention is multilevel logic optimization that considers power savings in addition to area savings and delay increases.

A further advantage of the invention is providing an improved method for determining the signal probability of a node.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Figure 4C:
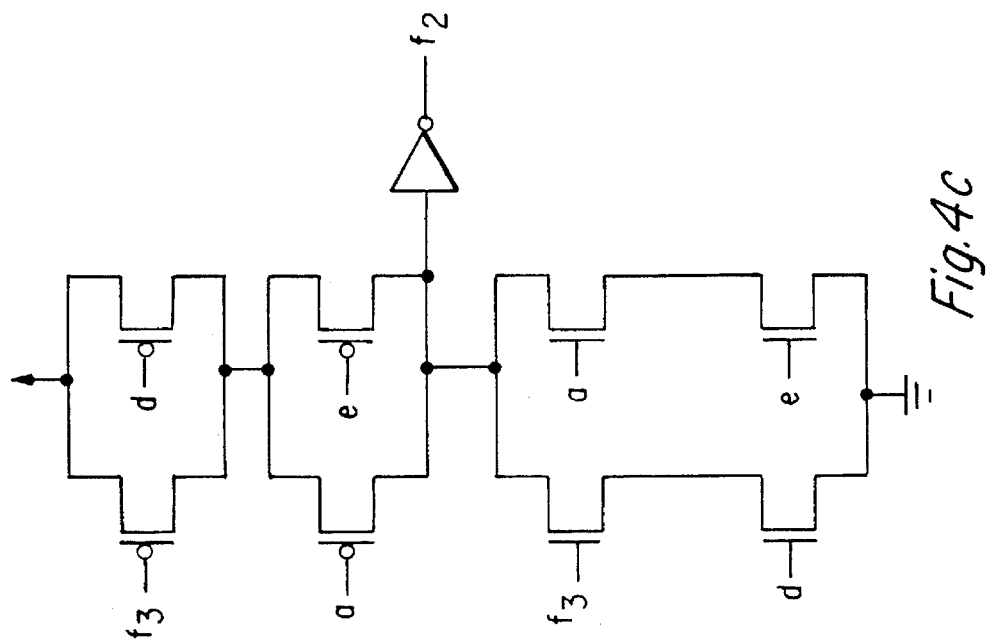
FIGS. 4a–c are schematic diagrams of a boolean network optimized according to prior art techniques.

Due to the sustained development of semiconductor technology, increasingly larger number of gates can be accommodated on a single integrated circuit with every new generation of the fabrication process. The minimization of power consumption in circuits is of extreme importance for both portable and nonportable systems. Lower power means longer battery life for portable systems. In nonportable systems reduction in power dissipation makes expensive heat sinking arrangements unnecessary. If power consumption is low enough, the ceramic packages can be replaced with plastic packages, which cost about 25% less. In a digital CMOS circuit, power is dissipated only when there is a transition (a ZERO to ONE or ONE to ZERO in logic value) at the output of a gate. The average number of transitions at circuit nodes is a measure of stress causing circuit activity which has been shown to cause failures. Hence, circuits synthesized to have low power dissipation are also less susceptible to run time failures.

The problem of determining when and how often transitions occur at a node in a static CMOS circuit is difficult because they depend on the applied input vectors, the sequence in which they are applied and the time instants at which they are applied. During the course of normal operation each of these vary widely. Therefore probabilistic techniques have been resorted to. Reported methods of estimating the probability of a transition at a circuit node involve estimation of Signal Probability, i.e. the probability that the logic value at a node is a ZERO or an ONE. A method for calculating the Signal probability according to the preferred embodiment of the invention will be described below.

Of the three sources of power dissipation in digital CMOS circuits—transitions, direct-path short circuit current, and leakage current—the first is by far the dominant and only it will be considered. In static CMOS circuits, there are spurious transitions at circuit nodes before they settle at one of the two logic levels. With careful design these can be minimized, as is well known in the art. Complex logic functions are implemented to have multiple levels and intermediate signals are created in addition to the outputs. Traditionally the decision to create, retain or remove an intermediate signal, whether made manually or by an automatic tool, has been based on the resulting area saving and increase in delay. The preferred embodiment of the invention also evaluates the power saving and takes it into account.

The circuits of interest are multi-output combinatorial logic blocks. They are described as a set F of completely specified boolean functions. Each boolean function f∈F, maps one or more input and intermediate signals to an output or a new intermediate signal. A circuit is represented as a boolean network. There is a node for each function. Each node has a boolean variable and a boolean expression associated with it. There is a directed edge to a node g from a node f, if the expression associated with node g contains in it the variable associated with f in either true or complemented form. A circuit is also viewed as a set of gates. Each gate has one or more input pins and one output pin. Several pins are electrically tied together by a signal. Each signal connects to the output pin of exactly one gate, called the driver gate. To each node in the boolean network there corresponds an unique subset (each gate in this subset belongs to this node and this node only) of the set of all gates. The gates in the subset implement the boolean function associated with the node. The final output signal of these gates is also referred to as the output of the node. The gate producing this signal is referred to as the driver gate of the node. Local signals, besides input and output signals, may be needed to interconnect the gates. Thus each node of the boolean network is a network itself. The nodes of this second level network are referred to as the internal nodes of the function. Thus, the boolean network can be viewed as defining a partition of the gates in the set of gates view. Both of these views are considered. The name of a variable is used to refer to the variable, the node of the boolean network the variable is associated with, the function, and the output signal of the node.

If leakage and direct-path short circuit currents are ignored, the average power drawn by a CMOS gate is given by $$W_{av} = \frac{1}{2} CV_{dd}^2 \left\{ \lim_{T \to \infty} \frac{n_s(T)}{T} \right\}$$

Here $V_{dd}$ is the supply voltage, C is the capacitance at the output of the gate, and $n_s(T)$ is the number of transitions of s(t), the logic signal at the output of the gate, in the time interval [−T/2, T/2]. The last term in equation (1) is the average number of transitions per unit time. Determining it by traditional means will call for simulation of the circuit for a very large number of input vectors. Instead, the following method will be used to determine the average numbers of transitions per unit time.

Transition Density

Let s(t), t∈(−∞,+∞), be a stochastic process which takes the values 0 or 1, transitioning from one to the other at random times. A stochastic process is said to be strict-sense stationary (SSS) if its statistical properties are invariant to a shift of the time origin. More importantly, the mean of such a process does not change with time. If a constant-mean process s(t) has a finite variance and is such that s(t) and s(t+τ) become uncorrelated as τ→∞, then s(t) is mean-ergodic. The term mean-ergodic refers to regular processes which are mean-ergodic and satisfy the two conditions of finite-variance and decaying auto-correlation.

The primary inputs to the circuit are modeled as mutually independent SSS mean-ergodic 0-1 processes. This has two consequences. The probability of signal s(t) assuming the logic value ONE at any given time t becomes a constant independent of time and is referred to as the equilibrium probability of random quantity s(t) and is denoted by P(s=1). Secondly the last term in equation 1 becomes the expected number of transitions per unit time and is referred to as the transition density of s(t) and is denoted by D(s). Since digital circuits can be thought of as non-linear but time-invariant systems, the signals at the internal and output nodes of the circuit are also SSS and mean-ergodic. Further the boolean functions describing the outputs of a logic module are decoupled from the delays inside the module by assuming the signals to have passed through special delay modules just prior to entering the module under consideration. This also has two consequences. The task of propagating equilibrium probabilities through the module is transformed into that of propagating signal probabilities. Secondly the transition densities at the outputs $y_j$ of the module are given by $$D(Y_j) = \sum_{i=1}^{n} P\left(\frac{\partial y_j}{\partial x_i}\right) D(x_i)$$

Here $x_i$, i=1, ... n are the module inputs and ∂y/∂x is the boolean difference of function y with respect to x and is defined by $$\frac{\partial y}{\partial x} = y|_{x=1} \oplus y|_{x=0} = y(x) \oplus y(\bar{x})$$

Signal Probabilities

The probability of a logic signal s expressed as P(s=1) is a real number in the range [0, 1] which expresses the probability that signal s has logic value 1. One way to look at the signal probability is that it equals the proportion of all possible inputs that cause the signal to assume a logic value 1. It is easy to compute signal probabilities for all nodes in a circuit that does not have reconvergent fanout. However, a circuit that does have reconvergent fanout is more difficult. An algorithm for determining signal probability will now be described. Each input signal and gate output is assigned a unique variable. Then, starting with the inputs and proceeding to the outputs, the expression for the output of each gate is written as a function of its input expressions. Standard expressions for each gate type for probability of its output signal in terms of its mutually independent input signals are used. Finally, all exponents are suppressed in a given expression to obtain the correct probability expression for that signal.

Figure 1:
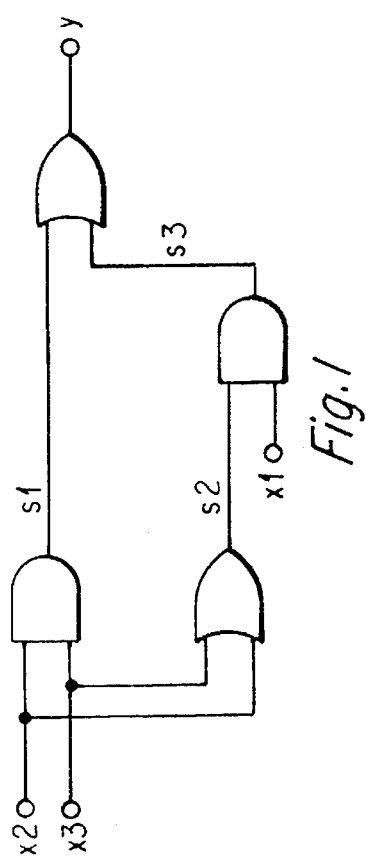
FIG. 1 is a schematic diagram of a boolean expression.

To illustrate computation of signal probabilities and transitions densities, Table 1 gives the results for circuit $y = x_1 \wedge (x_2 \vee x_3 \wedge x_2 \vee x_3$ in FIG. 1.

TABLE 1

| Node | Signal Probability Expression | Signal Probability | Transition Density |
|---|---|---|---|
| $x_1$ | a | 0.5 | 2.7 |
| $x_2$ | b | 0.5 | 13.5 |
| $x_3$ | c | 0.5 | .3 |
| $s_1$ | bc | 0.25 | 6.9 |
| $s_2$ | b + c − bc | 0.75 | 6.9 |
| $s_3$ | ab + ac − abc | 0.375 | 5.475 |
| y | ab + bc + ac − 2abc | 0.5 | 8.419 |

A data representation for signal probability expressions which allows performance of the necessary operations efficiently was devised. This representation has the advantage that exponents have been suppressed and so a product term may contain a variable (assigned to one of the inputs) raised to power 1 or may not contain it. So each product term may be regarded as a set with variables as its elements. The multiplication of two product terms can be achieved by taking the union of the corresponding sets. The primary inputs ($x_1$, $x_2$, and $x_3$ in example above) of the circuit under consideration are arbitrarily ordered and assigned indices. Let $x_j$, $0 \leq j < M$, be the primary inputs. Let $p_j$ be the variable (a, b, and c in the example above) assigned to input $x_j$, i.e. $P(x_j=1)=p_j$. A product term $Q_i$(a, bc, $-2$abc, etc. in the examples above) is represented as a pair ($C_i$, $B_i$), where both $C_i$ and $B_i$ are integers. $C_i$ is called the coefficient of the term and may be negative or positive. $B_i$ is regarded as a bit string. Bit j of $B_i$, written $b_{ij}$, is 1 if and only if the corresponding product term contains the variable $p_j$ and is 0 otherwise. Hence for the product term $-2$abc in the example above coefficient=$-2$ and the bit array=111. When two product terms $Q_i$ and $Q_j$ are multiplied, the resulting product term $Q_k$ is given by ($C_k$, $B_k$), where $C_k = C_i * C_j$, and $B_{kl} = B_{il} \wedge B_{jl}$.

A full order relation on the set of all possible product terms can be defined. $Q_i < Q_j$ if $B_i < B_j$, where both $B_i$ and $B_j$ are interpreted as integers. Each probability expression is represented as an ordered list of its product terms, i.e., In the example above, let the order of all possible product terms be:

| | |
|---|---|
| 1. | 001 |
| 2. | 010 |
| 3. | 011 |
| 4. | 100 |
| 5. | 101 |
| 6. | 110 |
| 7. | 111 | then, the probability expression for y would be:

P(y)=((1, 011), (1, 101), (1, 110), (−2, 111)).

The sum and product of two product terms can now be determined more quickly, i.e., the sum of two expressions P(G) and P(H) can be determined in $O(n_G + n_H)$ time and the product in $O(n_G * n_H)$ time.

In the preceding discussion it was implicitly assumed that the word size of the machine is larger than M. When this is not the case multiple words may be used to implement each $B_i$.

Multi-level Logic Optimization

When a common subexpression is factored out of L expressions ($L \geq 2$), the signal probabilities and transition densities at all the nodes of the boolean network remain unchanged. What changes is the capacitance at the output of the driver gate of each node which has as its associated variable one of the variables which occur in the common subexpression. Each such gate now needs to drive only 1/L times as many gates as before. This results in a reduction in the power dissipation. The driver gate of newly created node drives exactly as many gates as the driver gates of all the copies of the subexpression taken together. The power dissipation is unchanged. Now since there is only one copy of the common subexpression in place of L, there are 1/L times as many nodes internal to the common subexpression switching and dissipating power. Hence whenever a common subexpression is factored out, power saving results. The magnitude of the saving depends on the transition densities at the boundary and internal nodes of the common subexpression.

Let $g = g(u_1, u_2, \ldots, u_K)$; $K \geq 1$, be a common subexpression of functions $f_1, f_2, \ldots, f_L$; $L \geq 2$. Let $v_1, v_2, \ldots, v_M$; $M \geq 0$ be the nodes internal to g. Let D(x) be the transition density at node x, $n_{u_k}$ be the number of gates belonging to node g and driven by signal $u_k$ (there are gates not belonging to g which are also driven by $u_k$), $n_{v_m}$ be the number of gates driven by signal $v_m$, $C_0$ be the capacitance per gate, then reduction in power is, $$\Delta W(g) = (L-1) V_{dd}^2 C_0 \left( \sum_{k=1}^{K} n_{y_k} D(u_k) + \sum_{m=1}^{M} n_{v_m} D(v_m) \right)$$

The area saving $\Delta A(g)$ due to a divisor g is found as follows: let T(g) be the number of laterals in the factored form of g; then, $\Delta A(g) = (L-1)(T(g)-1)-1$.

The net saving is given by, $$S(g) = \alpha_W * \frac{\Delta W(g)}{W_T} + \alpha_A * \frac{\Delta A(g)}{A_T}$$

Here $W_T$ and $A_T$ are the area-and average power dissipation of the input boolean network, and $\alpha_W$ and $\alpha_A$ are weight factors. $0 \leq \alpha_A, \alpha_W \leq 1$, and $\alpha_W + \alpha_A = 1.0$.

At the beginning of the optimization procedure, signal probabilities and transition densities for each internal and output node are computed. Each time a common divisor $g = g(u_1, u_2, \ldots, u_K)$ is factored out, the $P(u_k=1)$ and $D(u_k)$, $1 \leq k \leq K$, are known but $P(v_m=1)$ and $D(v_m)$, $1 \leq m \leq M$, are not. The latter are computed when W(g) is being evaluated and are retained. Thus once again P(s=1) and D(s), for each node s are known.

The parameter $N_o$ is used to control the number of kernel intersections (cube-free divisors common to two or more functions) which are substituted into all the functions before the set of kernel intersections is recomputed. An expression is cube-free if no cube divides the expression evenly (e.g., ab+c is cube-free; ab+ac+abc is not cube-free). Recomputing after a single substitution is wasteful as only some of the functions have changed. On the other hand, with each substitution, some of the kernel intersections become invalid.

Figure 2:
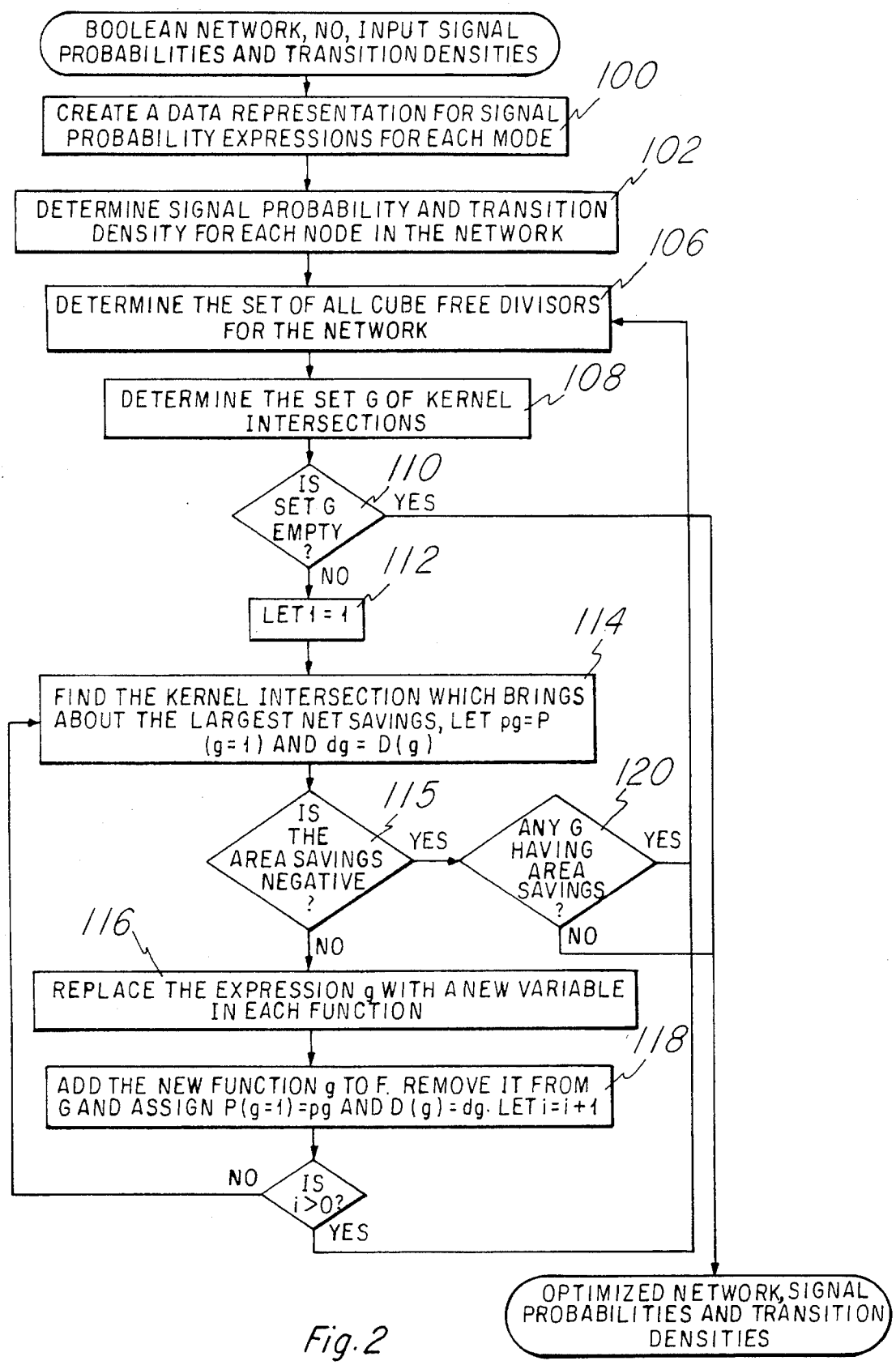
FIG. 2 is a flow diagram of a multilevel logic optimization method according to the preferred embodiment of the invention.

FIG. 2 shows a flow diagram of power dissipation driven multilevel logic optimization according to the preferred embodiment of the invention. The required inputs are: Boolean network F, input signal probability $P(x_i=1)$ and transition density $D(x_i)$ for each primary input, and $N_o$. After optimization, the resulting outputs are optimized boolean network F', P(s=1) and D(s) for each node in the optimized network. Beginning at step 100, a data representation for signal probability expressions is created for each node in the network as described above. Then, the signal probability and transition density (step 102) for each node in the Boolean network F are determined. At step 106, a set of kernels (cube-free divisors) is computed for each function f in F. The set G' is the union of all the sets of kernels, $K(f_1), \ldots K(f_n)$ and is defined as:

G'=$\cup_{f \in F} K(f)$

Kernels which apply to more than one function are placed in a set of kernel intersections G in step 108. The formula for determining G is:

G={g|(g∈G') ∧ (g∈K($f_i$)) ∧ (g∈K($F_j$)) ∧ (i≠j))}

If G is a null set, then the procedure is terminated by step 110. If G is not a null set, counter variable i is set equal to 1 in step 112.

Next, steps 114, 115, 116, and 118 are repeated No times. In step 114, the kernel intersection, g, which brings about the largest net savings is determined. In addition, the signal probability and transition density of the output signal g are saved as $p_g$ and $d_g$. Finally, if the area component of the net saving is negative, there are no more multiple cube divisors common to two or more functions and the repeat of steps 114, 116, and 118 is terminated in step 115. The procedure continues at step 120.

In step 116, each expression which has the expression g as one of its kernels, has the new variable $f_{n+1}$ substituted into its place in the expression. Finally, in step 118, the new function $f_{n+1}$ is added to the set of functions F and subtracted from the set G. The newly added node is assigned signal probability and transition density values from step 114.

If no kernel intersection with area saving >0 were found since the last computation of G, the procedure is terminated by step 120 and the optimization is complete.

After steps 114, 115, 116, and 118 have been repeated $N_o$ times, the process flow returns to step 106 to redetermine set G' and continue the optimization process.

Experimental Results

The preferred embodiment of the invention will now be described in reference to the following example. The area is in terms of literals. Instead of power W, a dimensionless real quantity $W/W_0$ was used, where $W_0=(10^6 C_0 V_{dd}^2)/2$ which corresponds to average power dissipated at a node which drives one gate and is experiencing $10^6$ transitions per second. $C_0$ is the capacitance per gate.

($\alpha_A=1$, $\alpha_W=0$) corresponds to the traditional multilevel optimization where power dissipation minimization is not considered. At first the choice of parameters ($\alpha_A=0$, $\alpha_W=1$) may appear strange, and one may expect the resulting areas to be very large. But as the results show that is not what happens. Reduction in power dissipation is achieved by eliminating, at a time, redundant copies of one subexpression which has higher weighted sum (weighted by the capacitance at the node) of transition densities at its nodes than other subexpressions. Elimination of any common subexpression automatically results in reduction in area.

Figure 3B:
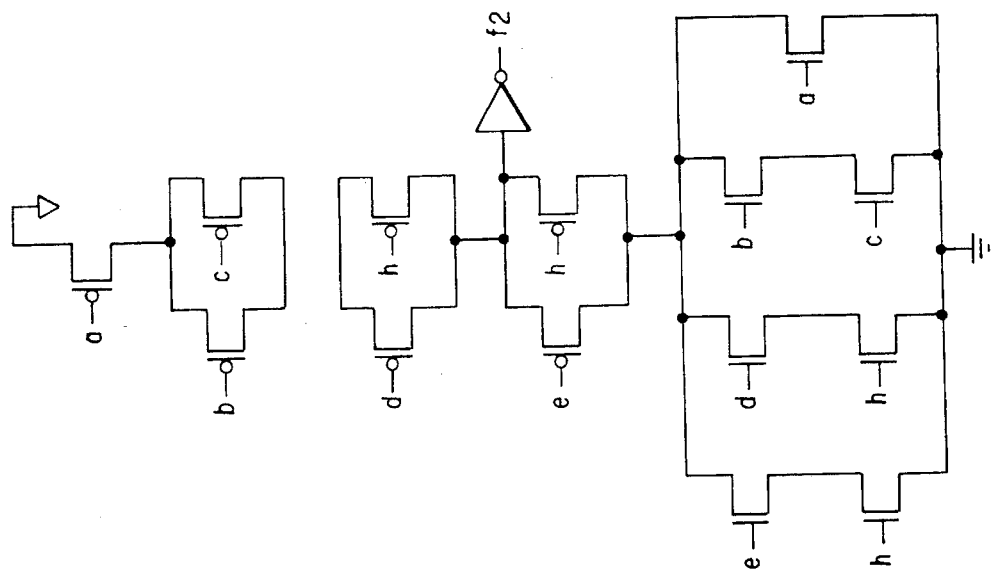
FIGS. 3a–b are schematic diagrams of an unoptimized boolean network.
Figure 3A:
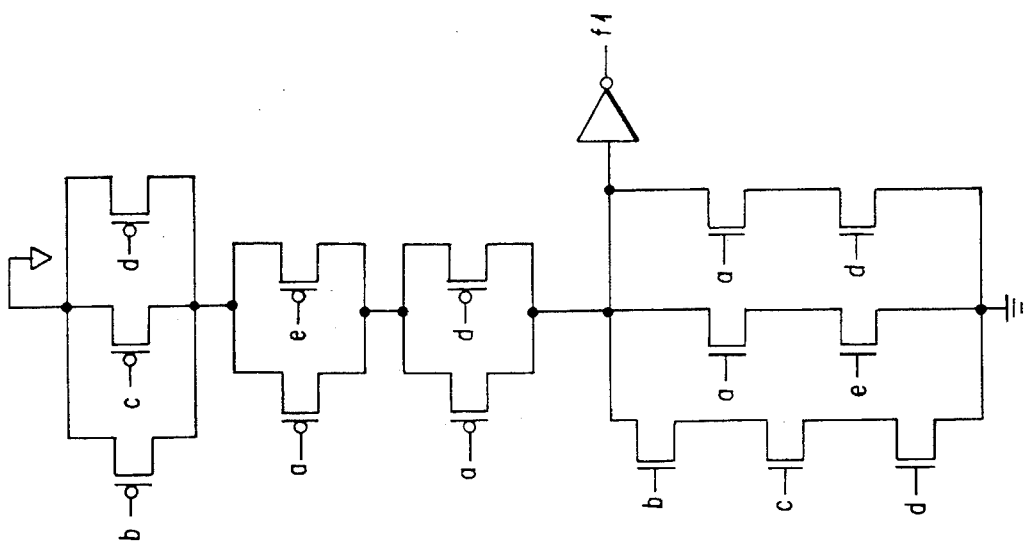

Let $F = \{f_1, f_2\}$
$f_1 = ad + bcd + ae$
$f_2 = a + bc + dh + eh$
$P(a) = P(b) = P(c) = P(d) = P(e) = P(h) = 0.5$
$D(a) = .1, D(b) = .6, D(c) = 3.6, D(d) = 21.6, D(e) = 129.6, D(h) = 3.6$
$N_o = 1$ FIGS. 3a–b show unoptimized network F.

The area and power for the above unoptimized network are as follows:

$A_T(F)=6+6=12$ $W_T(F)=503.35$

Next the set of kernels is computed for each function $f_1$, $f_2$ $K(f_1)=\{a+bc,d+e\}$ $K(f_2)=\{a+bc,d+e\}$ G' is then defined as the union of all sets of kernels, $K(f_1)+K(f_2)$ $G'=\{a+bc,d+e\}$ G is defined to contain all kernels which apply to more than one function.

$G=\{a+bc,d+e\}$

When $\alpha_A=1.0, \alpha_W=0$, (i.e., no power optimization is performed)

$g=a+bc, \Delta A(g)=1, \Delta W(g)=6.4, P(g)=0.625, D(g)=1.125, S(g)=0.083$ $g=d+e, \Delta A(g)=0, \Delta W(g)=151.2, P(g)=0.75, D(g)=75.6, S(g)=0$ $g=a+bc$ is selected as the kernel intersection which brings about the largest net savings. It is also substituted into functions in F and added to F to give F*.

$F^*=\{f_1, f_2, f_3\}$ $f_3=a+bc$ $f_1=f_3 d+ae$ $f_2=f_3+dh+eh$ $A_T(F^*)=3+4+4=11$ $W_T(F^*)=476.5$

Figure 4B:
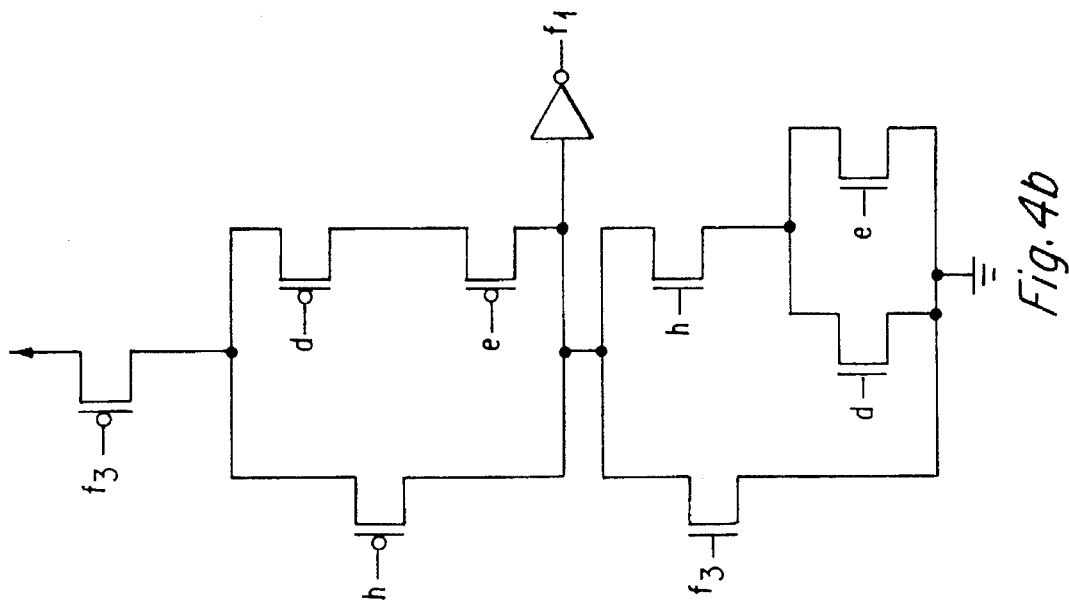
Figure 4A:
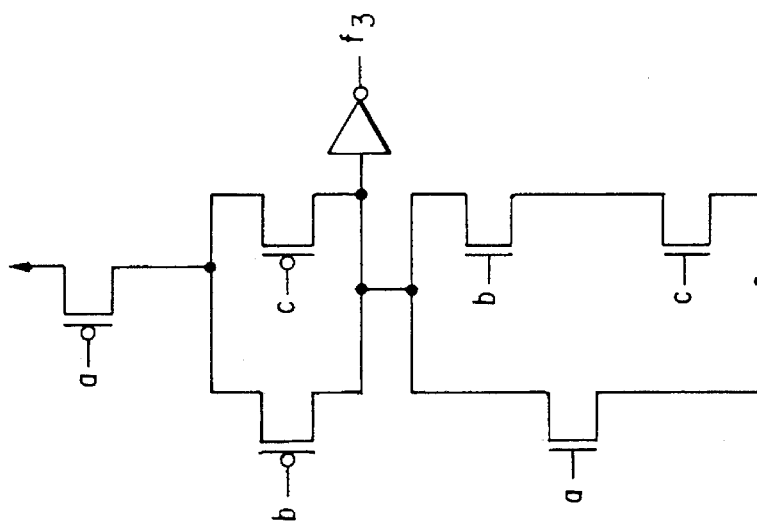

No more kernel intersections can be found. FIGS. 4a–c show network F optimized for area only.

If instead $\alpha_A=0, \alpha_W=1.0$, (i.e., power optimization is performed)

$g=a+bc, P(g)=0.625, D(g)=1.125, \Delta A(g)=1, \Delta W(g)=6.4, S(g)=0.013$ $g=d+e, \Delta A(g)=0, \Delta W(g)=151.2, P(g)=0.75, D(g)=75.6, s(g)=0.3$ This time $g=d+e$ is selected, substituted into functions in F and added to F to give F*.

Figure 5C:
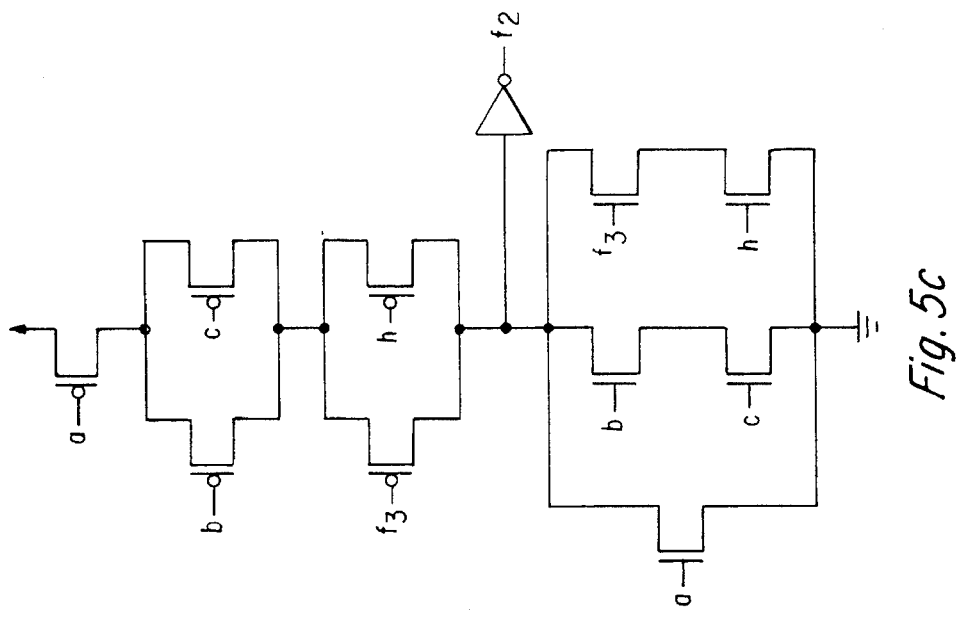
FIGS. 5a–c are schematic diagrams of a boolean network optimized according to the preferred embodiment of the invention.
Figure 5B:
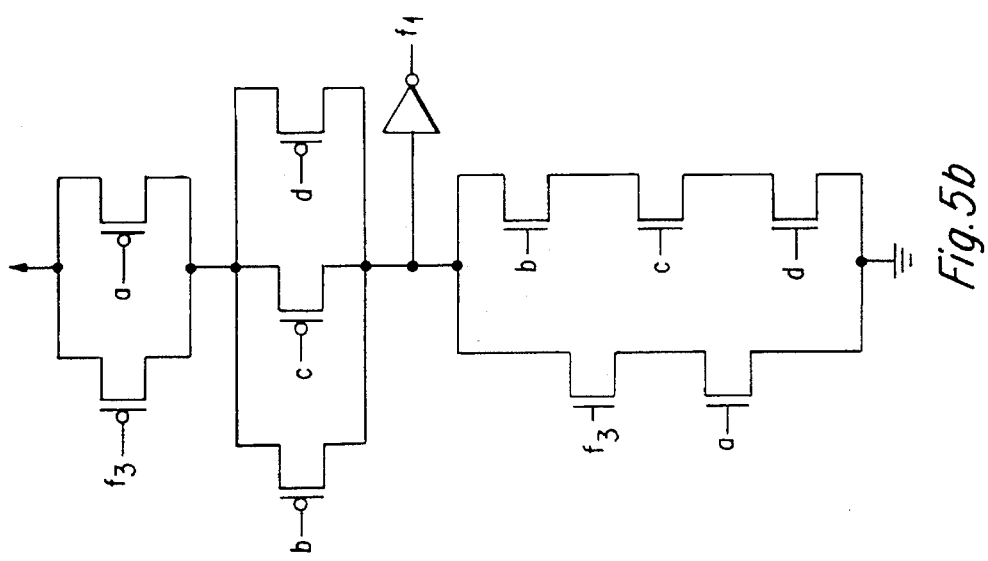
Figure 5A:
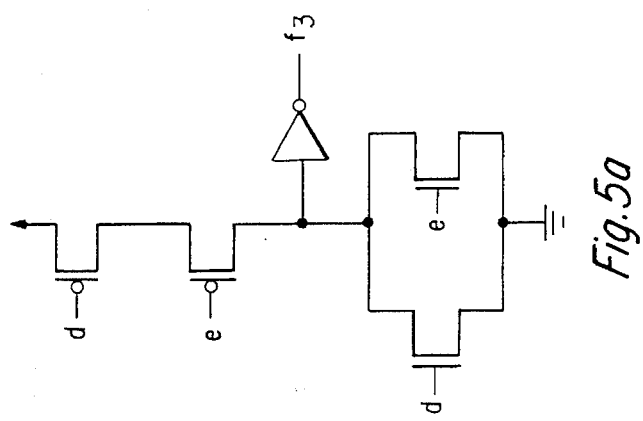

$F^*=\{f_1,f_2,f_3\}$ $f_3=d+e$ $f_1=f_3 a+bcd$ $f_2=a+bc+f_3 h$ $A_T(F^*)=2+5+5=12$ $W_T(F^*)=423.12$ No more kernel intersections can be found. FIG. 5a–c show network F optimized for area and power.

Hence using $\alpha_A=0, \alpha_W=1.0$, gives us a larger area (12 vs. 11) but a smaller power dissipation (423.12 vs 476.12).

As the complexity of systems being built grows so does the size of the logic needed to control them. The control sections of circuits comprise of finite state machines, logic to interpret external stimuli and status of the other sections being controlled, logic to affect state transitions as needed and logic to generate the control signals which go out to the other sections.

It can be stated that designers arrive at designing low power circuits from two angles. One group has, as the primary constraint, the price and operating cost of the finished product. These have to be low and the throughput has to be acceptable. The second groups has as their primary constraint the throughput of the finished product. It has to be the highest possible and the price and operating cost have to be not unreasonably high. Not all ways of reducing power dissipation are equally useful to both groups. But both the groups can benefit form using a CAD tool such as one described herein.

A few preferred embodiments have been described in detail hereinabove. It is to be understood that the scope of the invention also comprehends embodiments different from those described, yet within the scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for optimizing a boolean network having a plurality of functions, a plurality of inputs and a plurality of nodes, comprising the steps of:
   a. locating any cube-free divisors in the boolean network which apply to at least two of said plurality of functions;
   b. selecting the greatest divisor, wherein said greatest divisor is the cube-free divisor which brings about the largest net savings and wherein the net savings comprises both an area savings component and a power savings component;
   c. replacing the greatest divisor with a variable in each of said plurality of functions so as to enable further optimization; and
   d. adding said variable to said boolean network to create an optimized boolean network.

2. The method of claim 1 further comprising the step of repeating said locating, selecting, replacing and adding steps until no cube-free divisors which apply to at least two function can be located.

3. The method of claim 2 further comprising the steps of:
   a. determining area savings due to the greatest divisor before said replacing step; and
   b. skipping said replacing and adding steps if the area savings is less than zero.

4. The method of claim 1 further comprising the step of creating a data representation for each node by:
   a. assigning each input a variable;
   b. determining a plurality of expressions wherein, one of said expressions is associated with each of said nodes and said expressions are determined as a function of said inputs;
   c. suppressing all exponents in each expression to create a plurality of product terms for each expression;
   d. determining a coefficient and a bit string pair for each product term; and
   e. for each expression, ordering said coefficient and bit string pairs associated with each product term in said expression in a predetermined order.

5. The method of claim 4 further comprising the steps of:
   a. determining a node signal probability for each of said nodes using said data representation for each node; and
   b. determining a node transition density for each of said nodes.

6. The method of claim 5 further comprising the steps of:
   'a. determining a cube-free divisor signal probability of said cube-free divisors using said data representation for each node;
   b. determining a cube-free divisor transition density of said cube-free divisors; and
   c. determining the net savings for each of said cube-free divisors.

7. The method of claim 6 wherein said net savings is determined according to the following formula:

$$S(g) = \alpha_W * \frac{\Delta W(g)}{W_T} + \alpha_A * \frac{\Delta A(g)}{A_T}$$

where, $$\Delta A(g) = (L-1)(T(g)-1) - 1 \text{ and}$$

$$\Delta W(g) = (L-1) V_{dd}^2 C_0 \left( \sum_{k=1}^{K} n_{y_k} D(u_k) + \sum_{m=1}^{M} n_{v_m} D(v_m) \right)$$

wherein, $V_{dd}$ is the supply voltage $C_o$ is the capacitance per gate;

$n_{yk}$ is the number of gates to be driven by node g;

$n_{vm}$ is the number of gates to be driven by signal vm;

$D(u_k)$ is the transition density at node uk;

$D(v_m)$ is the transition density at vm;

$T(g)$ is the number of laterals factored out;

$W_T$ average power dissipation;

$A_T$ is the area of the boolean network;

$\alpha_A$ and $\alpha_W$ are weight factors; and

L is the number of expressions the subexpression is found in.

8. The method of claim 6 wherein the transition density is determined according to the following formula: where $$D(Y_j) = \sum_{i=1}^{n} P\left( \frac{\partial y_j}{\partial x_i} \right) D(x_i)$$

$$\frac{\partial y}{\partial x} = y \mid_{x=1} \oplus y \mid_{x=0} = y(x) \oplus y(\bar{x})$$

wherein $\partial_x/\partial_y$ is the boolean difference of function y with respect to x;

P is the probability of the logical signal;

$D(X_i)$ is the input transition density.

9. The method of claim 1 further comprising the steps of:
   a. creating a divisor set containing said cube-free divisors, wherein said greatest divisor is a member of the divisor set;
   b. removing said greatest divisor from said divisor set after said adding step;
   c. performing said selecting, replacing, adding and removing steps a predetermined number of times unless no member of the divisor set results in said area savings; and
   d. repeating said locating, creating, and performing steps until said divisor set is empty or no member of the divisor set results in said area savings.

10. The method of claim 9 further comprising the steps of:
    a. determining area savings due to the greatest divisor before said replacing step; and
    b. skipping said replacing and adding steps if the area savings is less than zero.

11. The method of claim 6 wherein said net savings is determined according to the following formula:

$$S(g) = \alpha_W * \frac{\Delta W(g)}{W_T} + \alpha_A * \frac{\Delta A(g)}{A_T}$$

where,

-continued $$\Delta A(g) = (L-1)(T(g)-1) - 1 \text{ and}$$

$$\Delta W(g) = (L-1) V_{dd}^2 C_0 \left( \sum_{k=1}^{K} n_{y_k} D(u_k) + \sum_{m=1}^{M} n_{v_m} D(v_m) \right)$$

wherein, $V_{dd}$ is the supply voltage;

$C_o$ is the capacitance per gate;

$n_{yk}$ is the number of gates to be driven by node g;

$n_{vm}$ is the number of gates to be driven by signal vm;

$D(u_k)$ is the transition density at node uk;

$D(v_m)$ is the transition density at vm;

T(g) is the number of laterals factored out;

$W_T$ average power dissipation;

$A_T$ is the area of the boolean network;

$\alpha_A$ and $\alpha_W$ are weight factors; and

L is the number of expressions the subexpression is found in.

12. A method for optimizing a boolean network having a plurality of functions and a plurality of nodes, comprising the steps of:

a. creating a data representation for each node by:
 i. assigning each input a variable;
 ii. determining a plurality of expressions wherein, one of said expressions is associated with each of said nodes and said expressions are determined as a function of said inputs;
 iii. suppressing all exponents in each expression to create a plurality of product terms for each expression;
 iv. determine a coefficient and a bit string pair for each product term;
 v. for each expression, order said coefficient and bit string pairs associated with each product term in said expression in a predetermined order:

b. determining a signal probability using said data representation for each of said nodes;

c. determining a transition density for each of said nodes;

d. locating all cube-free divisors for the boolean network;

e. creating a divisor set, said divisor set comprising any of said cube-free divisors which apply to at least two of said plurality of functions;

f. determining the signal probability, transition density, and net savings for each member of said divisor set;

g. extracting a greatest divisor, wherein said extracting step comprises:
 i. determining the greatest divisor, said greatest divisor being the cube-free divisor in said divisor set which brings about the largest net savings wherein said net savings comprises an area savings component and a power savings component;
 ii. replacing the greatest divisor with a variable in each of said plurality of functions;
 iii. adding said variable to said boolean network;
 iv. removing said greatest divisor from said divisor set;

h. repeating said extracting step a predetermined number of times unless no member of said divisor set generates area savings; and i. repeating said locating, creating, extracting and repeating steps until no cube-free divisors which apply to at least two functions can be found or no member of said divisor set generates area savings.

13. The method of claim 12 wherein the transition density is determined according to the following formula:

$$D(Y_j) = \sum_{i=1}^{n} P\left(\frac{\partial_{y_j}}{\partial_{x_i}}\right) D(x_i)$$

where $$\frac{\partial_y}{\partial_x} = y\,|_{x=1} \oplus y\,|_{x=0} = y(x) \oplus y(\bar{x})$$

wherein $\partial_x/\partial_y$ is the boolean difference of function y with respect to x;

P is the probability of the logic signal;

$D(X_i)$ is the input transition density.

14. The method of claim 12 wherein said net savings is determined according to the following formula:

$$S(g) = \alpha_W * \frac{\Delta W(g)}{W_T} + \alpha_A * \frac{\Delta A(g)}{A_T}$$

where, $$\Delta A(g) = (L-1)(T(g)-1) - 1 \text{ and}$$

$$\Delta W(g) = (L-1) V_{dd}^2 C_0 \left( \sum_{k=1}^{K} n_{y_k} D(u_k) + \sum_{m=1}^{M} n_{v_m} D(v_m) \right)$$

wherein, $V_{dd}$ is the supply voltage;

$C_o$ is the capacitance per gate;

$n_{yk}$ is the number of gates to be driven by node g;

$n_{vm}$ is the number of gates to be driven by signal vm;

$D(u_k)$ is the transition density at node uk;

$D(v_m)$ is the transition density at vm;

T(g) is the number of laterals factored out;

$W_T$ average power dissipation;

$A_T$ is the area of the boolean network;

$\alpha_A$ and $\alpha_W$ are weight factors; and

L is the number of expressions the subexpression is found in.

* * * * *